(12) United States Patent
Simon et al.

(10) Patent No.: US 7,750,506 B2
(45) Date of Patent: Jul. 6, 2010

(54) LOAD AND SYSTEM

(75) Inventors: Olaf Simon, Bruchsal (DE); Jochen Mahlein, Karlsruhe (DE); Josef Schmidt, Graben-Neudorf (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 904 days.

(21) Appl. No.: 10/583,477

(22) PCT Filed: Nov. 23, 2004

(86) PCT No.: PCT/EP2004/013267
§ 371 (c)(1), (2), (4) Date: Jun. 19, 2006

(87) PCT Pub. No.: WO2005/064763
PCT Pub. Date: Jul. 14, 2005

(65) Prior Publication Data
US 2007/0145936 A1    Jun. 28, 2007

(30) Foreign Application Priority Data
Dec. 19, 2003   (DE) ................ 103 60 604

(51) Int. Cl.
*H01F 37/00* (2006.01)
(52) U.S. Cl. .................................... 307/104
(58) Field of Classification Search ......... 307/104, 307/17, 19
See application file for complete search history.

(56) References Cited

U.S. PATENT DOCUMENTS

| | | | |
|---|---|---|---|
| 4,123,690 A * | 10/1978 | Osteen | 315/258 |
| 5,279,292 A | 1/1994 | Baumann et al. | |
| 5,293,308 A | 3/1994 | Boys et al. | |
| 5,898,578 A * | 4/1999 | Tamura et al. | 363/19 |
| 6,005,304 A | 12/1999 | Seelig | |
| 6,188,179 B1 * | 2/2001 | Boys et al. | 315/244 |
| 6,252,630 B1 | 6/2001 | Kusumi et al. | |
| 6,326,584 B1 * | 12/2001 | Jewett et al. | 219/121.57 |
| 2004/0051628 A1 | 3/2004 | Uhl | |
| 2006/0209487 A1 | 9/2006 | Schmidt et al. | |

FOREIGN PATENT DOCUMENTS

| | | |
|---|---|---|
| DE | 44 46 779 | 6/1996 |
| DE | 196 36 031 | 3/1998 |
| DE | 100 53 373 | 5/2002 |
| DE | 101 12 892 | 10/2002 |
| DE | 103 12 792 | 8/2004 |
| DE | 103 12 284 | 10/2004 |
| DE | 103 38 852 | 3/2005 |
| DE | 103 39 340 | 4/2005 |
| DE | 103 49 242 | 4/2005 |

(Continued)

OTHER PUBLICATIONS

International Search Report from International Application No. PCT/EP2004/013267, Nov. 23, 2004.

(Continued)

*Primary Examiner*—Albert W Paladini
(74) *Attorney, Agent, or Firm*—Kenyon & Kenyon LLP (57) ABSTRACT

A load, including an electric motor and electronic circuit for powering the electric motor, the load being inductively powered.

26 Claims, 13 Drawing Sheets

FOREIGN PATENT DOCUMENTS

| | | |
|---|---|---|
| DE | 103 44 144 | 5/2005 |
| EP | 0 499 939 | 8/1992 |
| WO | WO 92/17929 | 10/1992 |
| WO | WO 98/57413 | 12/1998 |
| WO | WO 99/50806 | 10/1999 |
| WO | WO 02/37642 | 5/2002 |

OTHER PUBLICATIONS

International Preliminary Report on Patentability from International Application No. PCT/EP2004/013267, Nov. 23, 2004.

Translation of Written Opinion of the International Searching Authority, PCT International Patent Application No. PCT/EP2004/013267, Nov. 23, 2004.

* cited by examiner

LOAD AND SYSTEM

FIELD OF THE INVENTION

The present invention relates to a load and a system.

BACKGROUND INFORMATION

In industrial plants, it is conventional that electrical loads, such as electronic devices, lighting devices, drives, machines, and the like can be powered from a network, in particular using alternating current at 50 or 60 Hz. To this end, the loads are mostly mechanically attached and electrically connected by expensive plug-and-socket connectors. In addition, most of such systems or machines have a T-piece for each drive unit as an energy branch. These T-pieces are difficult to install and expensive, in particular when they must be usable and provide a high degree of protection in wet areas or even aseptic areas. These T-pieces are also referred to as distribution boxes and often include additional device parts as well, such as emergency-off switches. Therefore, they are complicated and expensive, especially with regard to installation as well.

SUMMARY

Example embodiments of the present invention may provide simpler and more cost-effective wiring in electrical loads and systems.

In the case of the electrical load, the load may include an electronic circuit for supplying power, the load being able to be powered, on the whole, inductively.

In this context, it may be provided that the load may be manufactured in a cost-effective manner to be impervious and to provide a high degree of protection, for the contactless powering of the load may allow the housing to be manufactured simply and easily, e.g., without uneven areas or plug-and-socket connectors, and therefore may allow water to drain off and the settling of solids to be prevented. Therefore, it may be particularly usable in wet areas and aseptic areas. The time necessary for wiring may be reduced. In addition, leakage currents that occur in conventional plug-and-socket wiring may be prevented, which means that improved electromagnetic compatibility may be produced.

The power supply to the loads may be voltageless, and the carrying-over of voltage otherwise present in systems, as well as spark-suppression devices in disconnecting switches, may be eliminated. In addition, reactive-power compensation is made possible, e.g., in the load, and therefore the alternating current has smaller values, which is why smaller wire diameters may be provided in the case of primary conductors and lower wiring costs are therefore attainable. Disconnecting switches may be eliminated, since interruption may be replaced by extraction of the primary conductor.

A primary conductor is provided on the load such that an inductive coupling to a secondary winding included in the load is providable. It may be provided that a plug-and-socket connector is not necessary, and that the wiring may therefore be carried out in a simple and rapid manner. In addition, it is possible to reduce costs. Since it is not necessary to precut the cable and fit it with connectors, the installation may also be carried out by employees not trained in electrical technology.

At least one primary conductor may be provided in a groove or a cable duct of the load. In this context, it may be provided that the cable may be arranged very simply and rapidly, e.g., by merely pressing it into the groove or the cable duct. In addition, encapsulation by an encapsulating material may be implemented.

At least one secondary winding may be wound around a U-shaped and/or E-shaped core or integrated into a very shallow receiving head. In this context, it may be provided that the arrangement may be selected as a function of the utilized method, desired power output, and desired efficiency.

The primary conductors may be at least partially encapsulated and/or protected by a cover. In this context, it may be provided that an especially high degree of protection is attainable, and that no cavities are produced which are at risk of being soiled. Such conductor parts encapsulated in a cover or holder may be mounted on a smooth housing surface of the load, which means that no groove or duct may need to be provided on the load.

The load may be impervious, smooth on the outer surface, and/or manufactured to have a high degree of protection. In this context, it may be provided that the load may be provided, e.g., for use in wet areas and/or aseptic areas.

The load may not include a plug-and-socket connector or other electrical connection terminals on its exterior. In this context, it may be provided that the load may be easily manufactured to be impervious and to provide a high degree of protection.

LIST OF REFERENCE CHARACTERS

1 housing
2 rotor shaft
3 housing part
4 primary conductor
5 primary conductor
6 indentation
7 core having a U-shaped cross-section
21 primary conductor
22 primary conductor
23 clip
24 groove
25 groove
26 housing part
27 core having a U-shaped cross-section
28 second core having a U-shaped cross-section
31 cover
32 primary conductor
33 primary conductor
34 cable duct
35 core having a E-shaped profile
36 core having a E-shaped profile
37 housing part
40 tap holes
41 E-shaped cores
50 region for flat transformer head Example embodiments of the present invention are explained in more detail below with reference to the appended Figures.

DETAILED DESCRIPTION

Figure 1A:
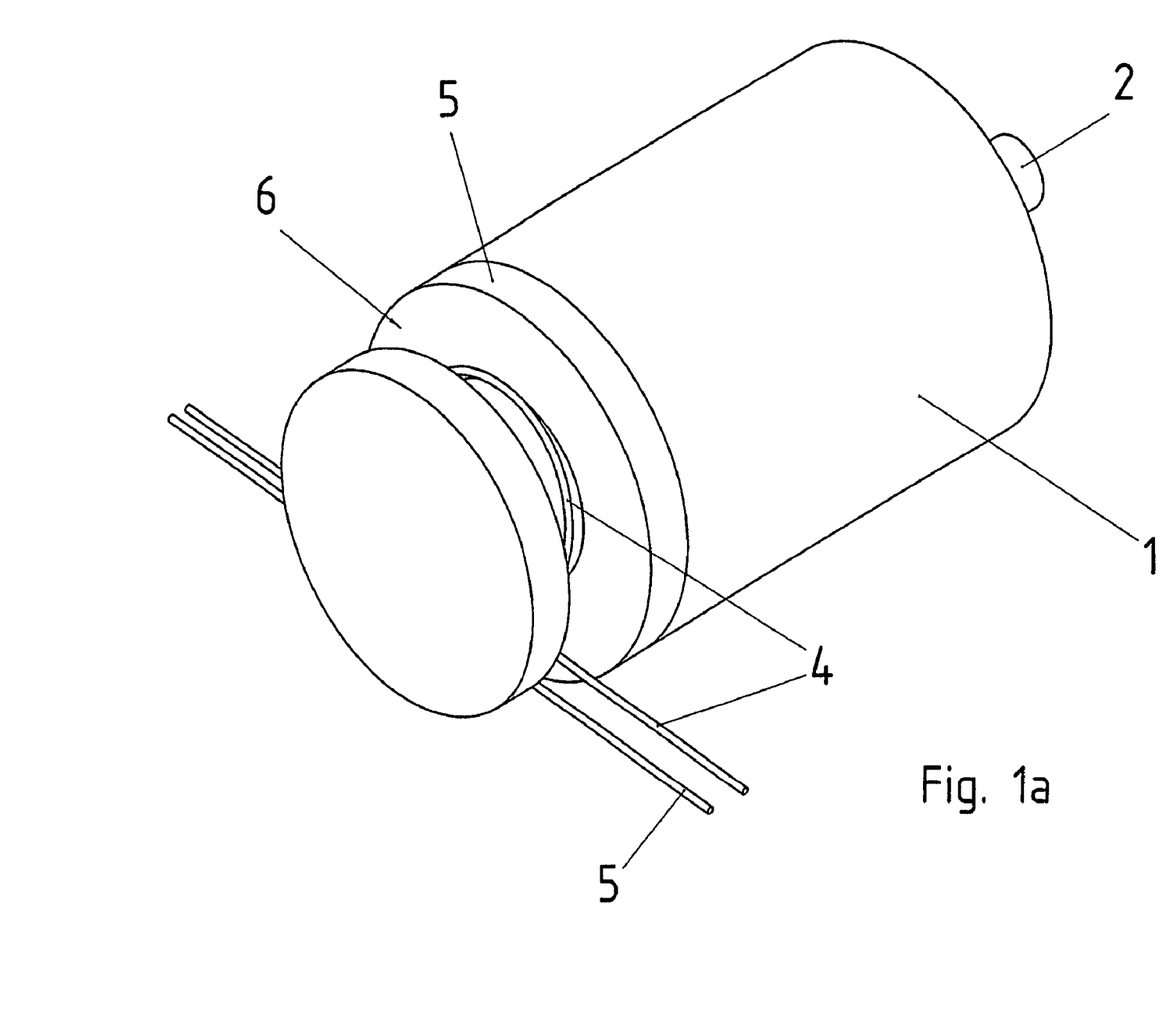
FIGS. 1a to 1c illustrate an example embodiment of the present invention.
Figure 1B:
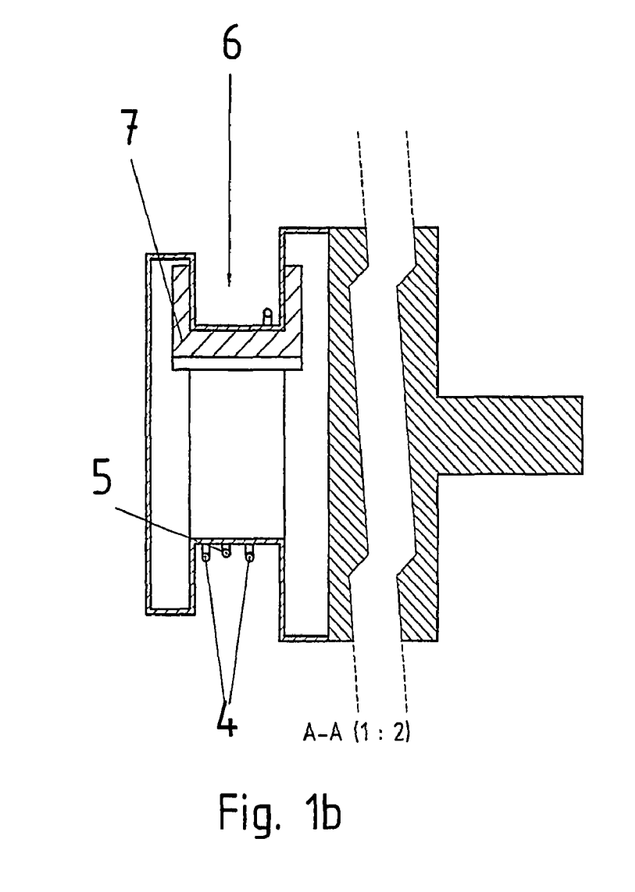
Figure 1C:
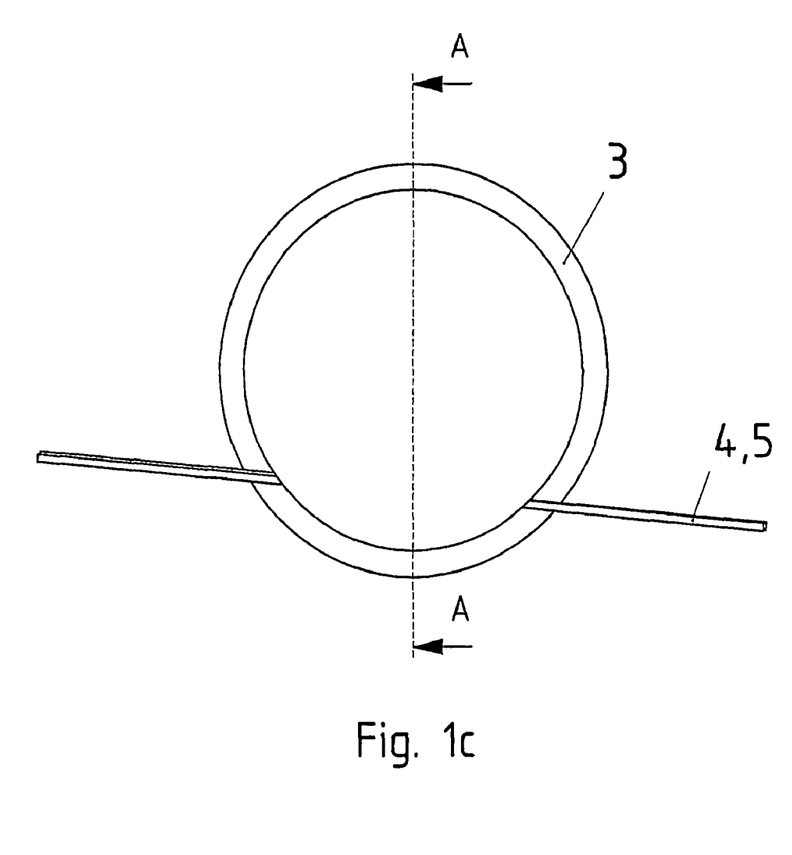

Illustrated in FIGS. 1a, 1b, and 1c are an isometric view, a sectional view, and a top view of a drive unit in the form of a load according to an example embodiment of the present invention. The drive unit includes an electric motor having a rotor shaft 2, which is surrounded by a housing 1. The electronic circuit for powering and controlling the electric motor is substantially protected by housing part 3, which has an indentation 6 in which a primary conductor is secured, using a winding loop. The return line, i.e., the second primary conductor, is only lead through, i.e., not wrapped around the drive unit.

Housing part 3 includes a core 7 having a U-shaped cross-section, into which a secondary winding is arranged that powers the electronic circuit. Therefore, the load may be powered by the inductive coupling in a contactless manner, and is therefore galvanically separated from the primary circuit. The power supply of the load may be disconnected rapidly and easily by unwinding or taking down the loop of the primary conductor.

The primary circuit is powered by a device, which generates the medium-frequency, primary current and is powered by line voltage itself. For example, this device exhibits a power-source behavior with respect to the primary current generated by it.

Information may be transmitted by modulating higher-frequency signals onto the primary conductor, as the electronic circuit includes device(s) for demodulating the signals. To exchange information, the electronic circuit also includes modulation device(s), which means that signals may also be modulated onto the primary conductor.

In this manner, the drive unit in the form of a load may therefore be powered in a contact-free manner. Thus, an installation technique, i.e., a powering principle, may be implemented in industrial systems and/or machines, for during the installation of the loads, these do not need to be electrically connected and wired with the aid of expensive plug-and-socket connectors, but it is sufficient for a primary conductor to be wrapped around in the indentation of the drive unit. Since the powering may take place in series, a distribution box or T-piece is also not necessary. The load may be switched off by simply and rapidly lifting the primary conductor out of the load or removing it from the load.

In addition, a high degree of protection is realizable, since plug-and-socket connectors are eliminated and the load, e.g., the drive unit, may therefore be inexpensively manufactured, along with its housing, so as to be impervious. Therefore, the drive unit may be manufactured to have, e.g., a smooth housing and is consequently usable in aseptic applications or wet applications.

Devices for potential segregation and other separating devices may be eliminated, since the wall thickness of the housing may be appropriately dimensioned and the inductive coupling may be easily disconnected.

The electronic circuit also includes the secondary device for transmitting power inductively, i.e., without contact. This device may include passive components, i.e., capacitors and windings about coil cores. In a simple arrangement, the transformer head is wound with a winding in the form of a secondary winding, and a capacitor is connected in outgoing circuit, the capacitance of the capacitor being in resonance with the inductance of the winding, the resonant frequency corresponding to the frequency of the alternating current in the primary conductor or deviating from it by not more than, e.g., 10%.

The drive units may be powered in series by the primary conductor. It is possible to decouple individual motors without having to interrupt the power supply of the others. The primary-conductor loop may be removed from around the drive unit, e.g., by lifting the conductor loop out of the indentation.

The wiring may also eliminate the need for T-pieces.

The drive unit is illustrated as a rotary drive in FIGS. 1a, 1b, and 1c. The drive unit may be implemented as a linear drive and may be inductively powered.

Instead of the drive unit, a different electrical load may be provided with device(s) for inductive powering.

Figure 2A:
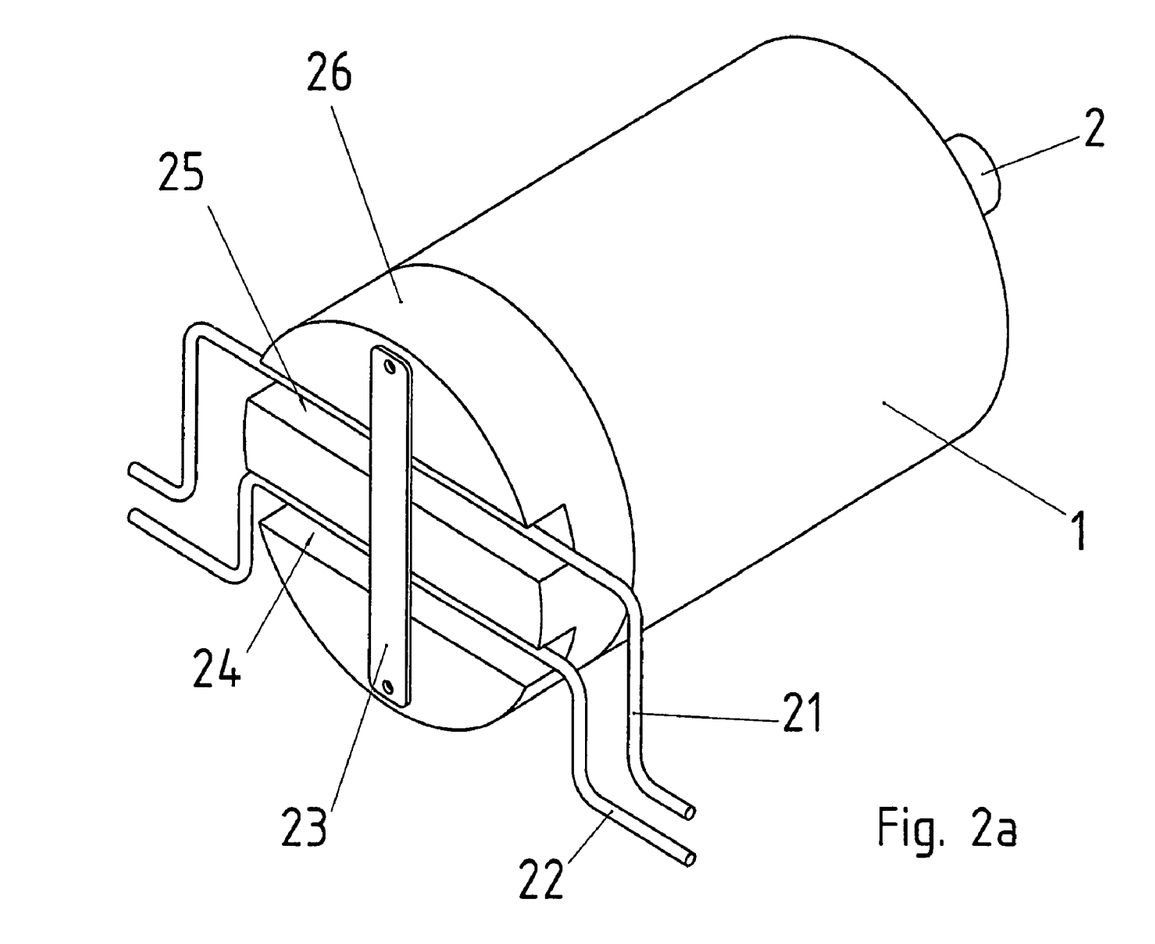
FIGS. 2a to 2c illustrate an example embodiment of the present invention.
Figure 2B:
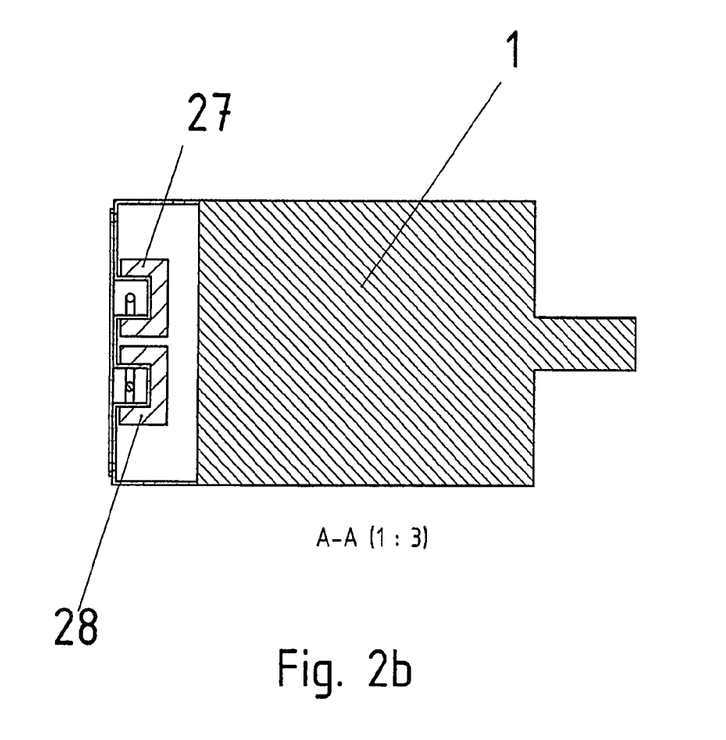
Figure 2C:
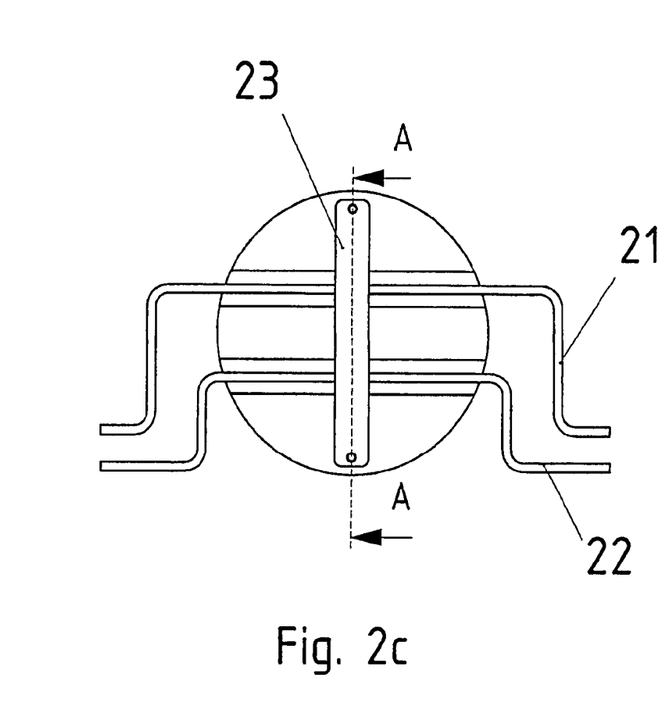

As illustrated in FIGS. 2a, 2b, and 2c, cores 27, 28 having a U-shaped cross-section may be located on the B-side with grooves for primary conductors 21 and 22. A clip 23 is used for fixing the primary conductors in position in their grooves. Only one core 27 may be necessary for the functionality. Additional core 28 may increase the efficiency of the entire device. The secondary windings on the two cores 27, 28 are interconnected and power the electronic circuit, which is arranged in the region of housing cover 26 that is provided on the B-side of housing 1.

Figure 3:
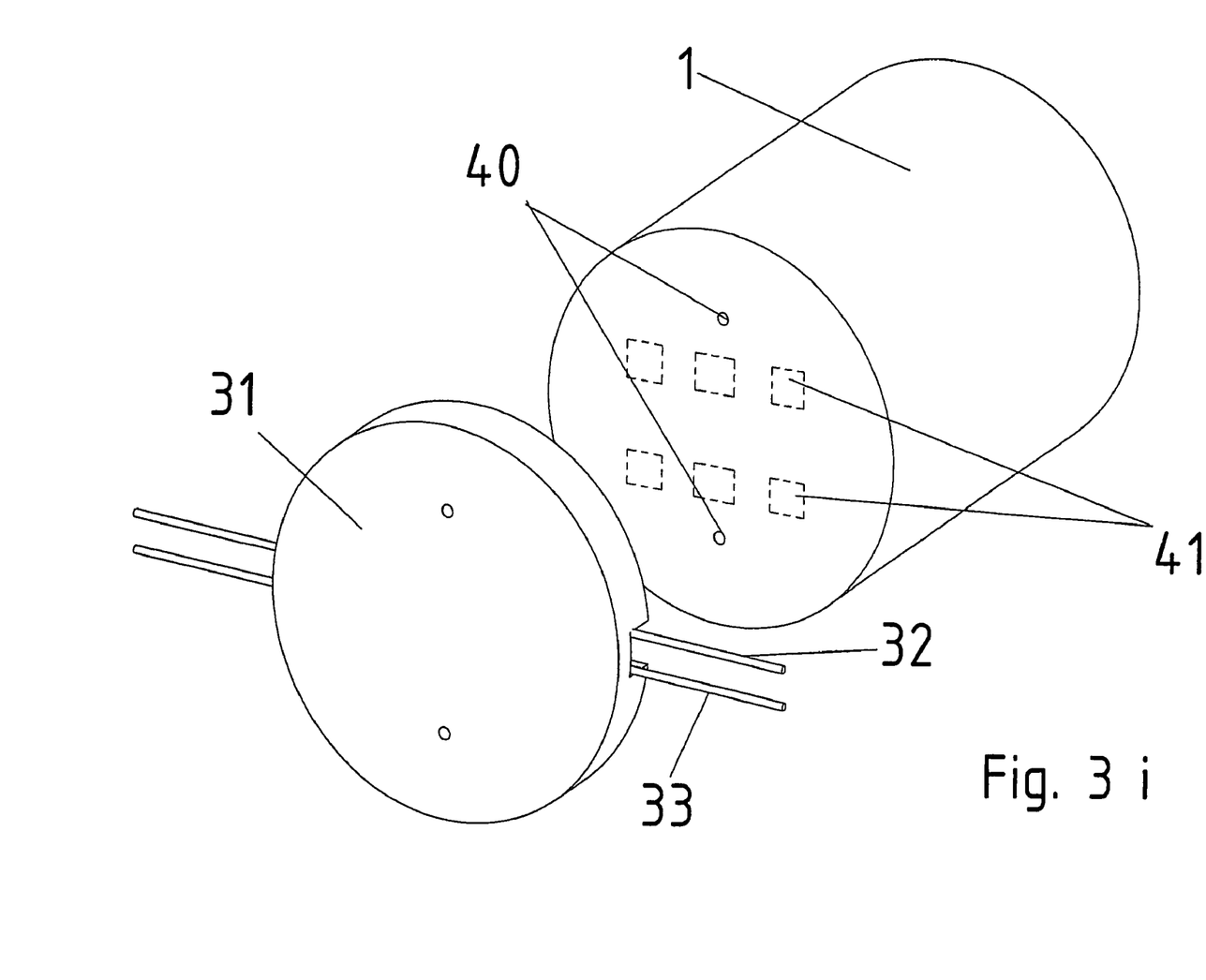
FIGS. 3a to 3l illustrate an example embodiment of the present invention.
Figure 3A:
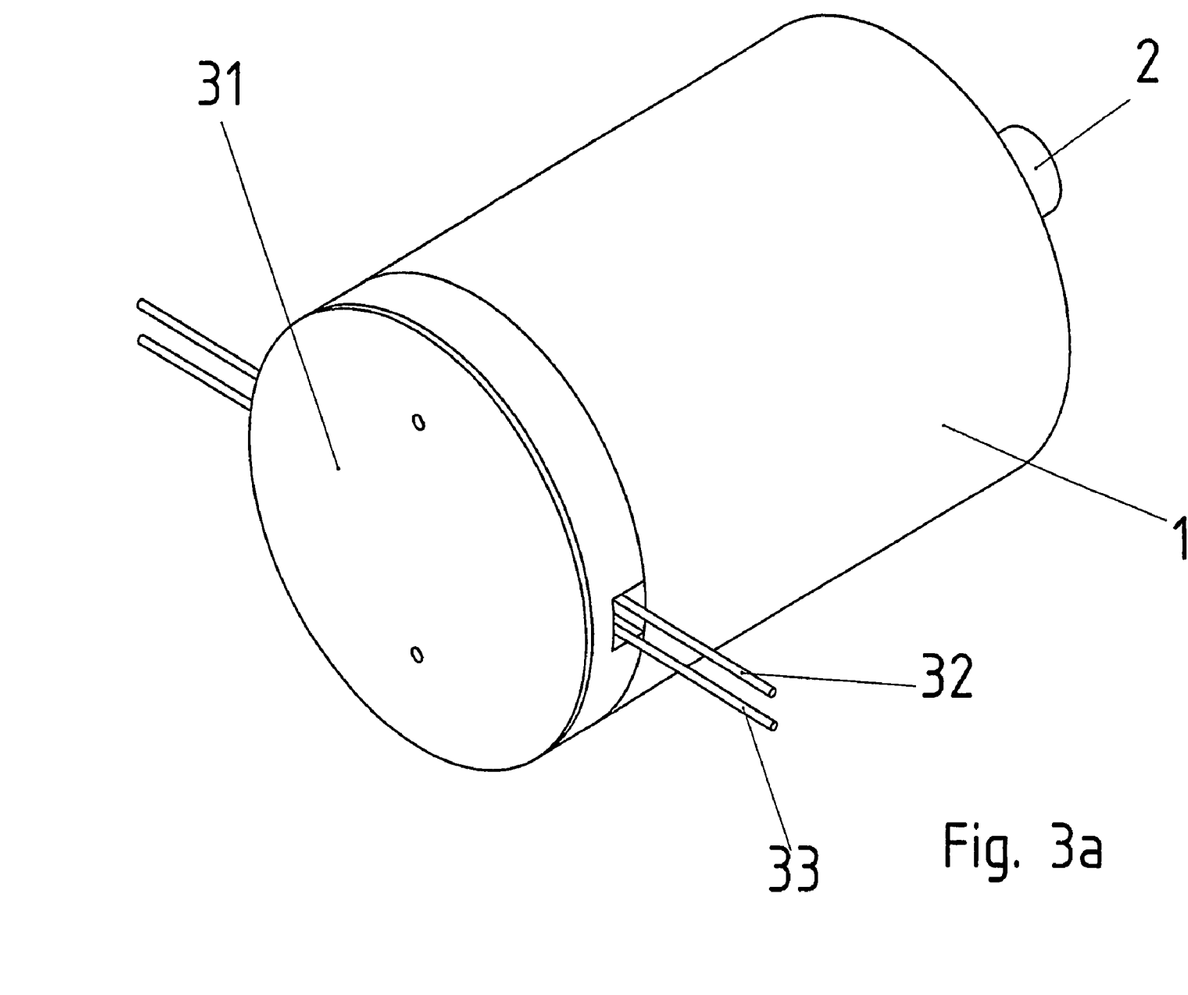
Figure 3B:
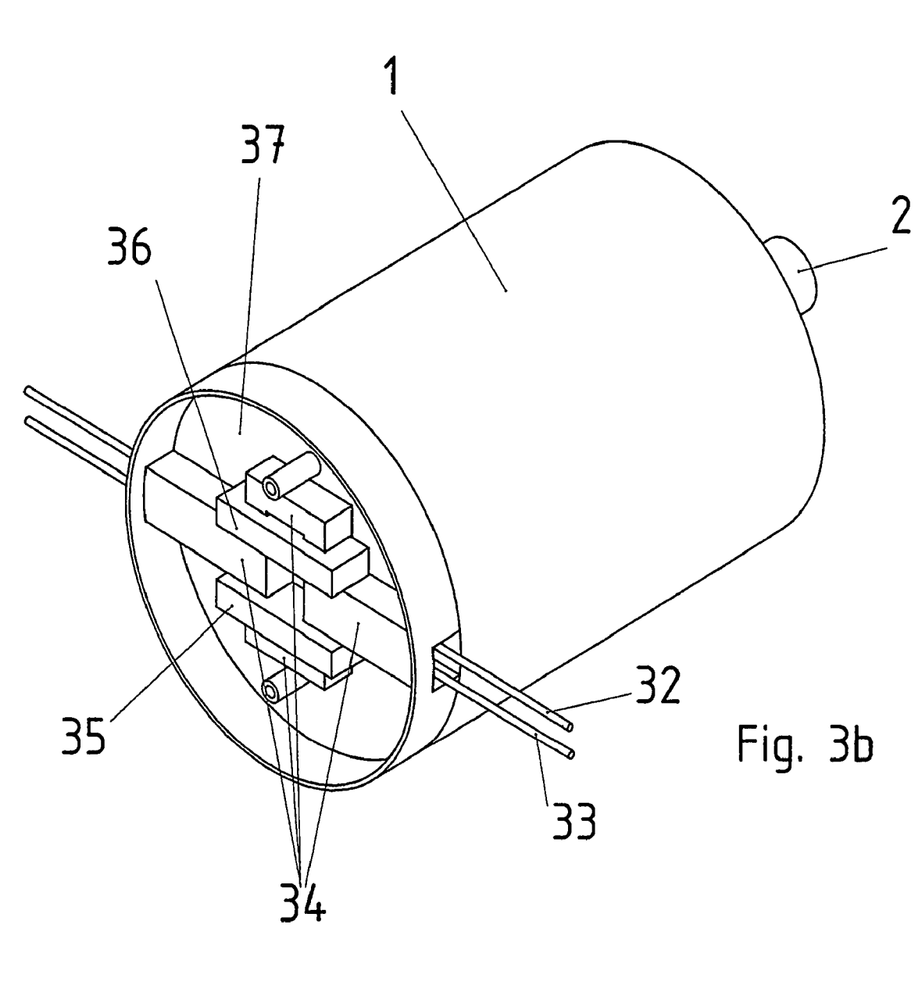
Figure 3C:
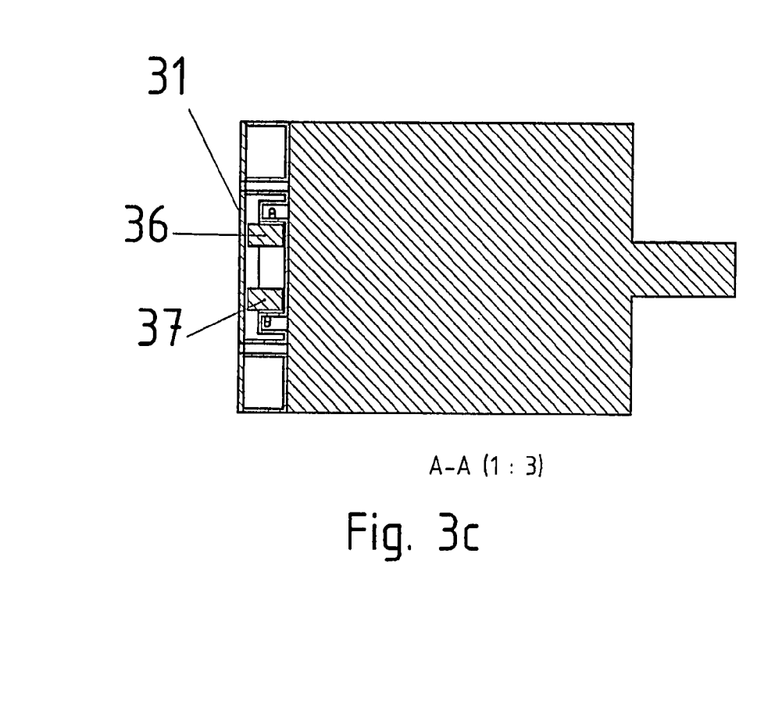
Figure 3D:
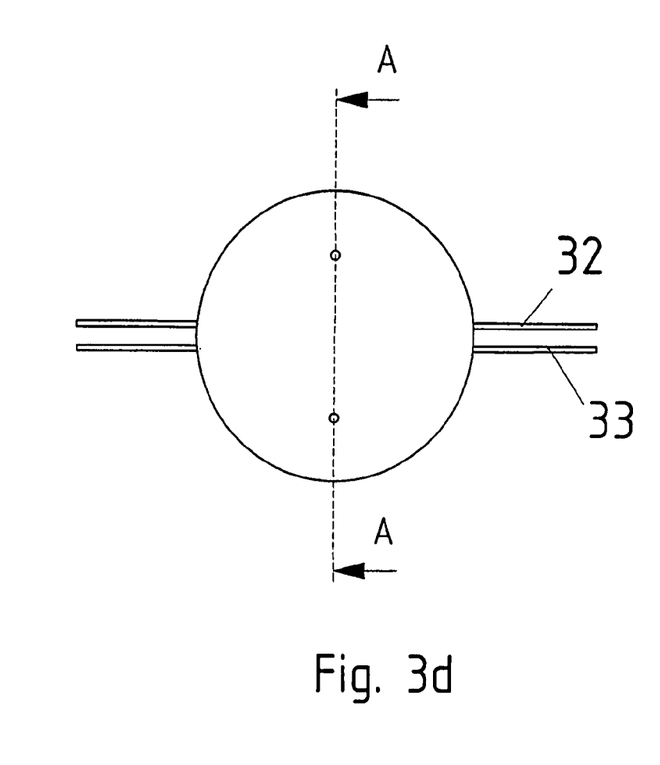
Figure 3E:
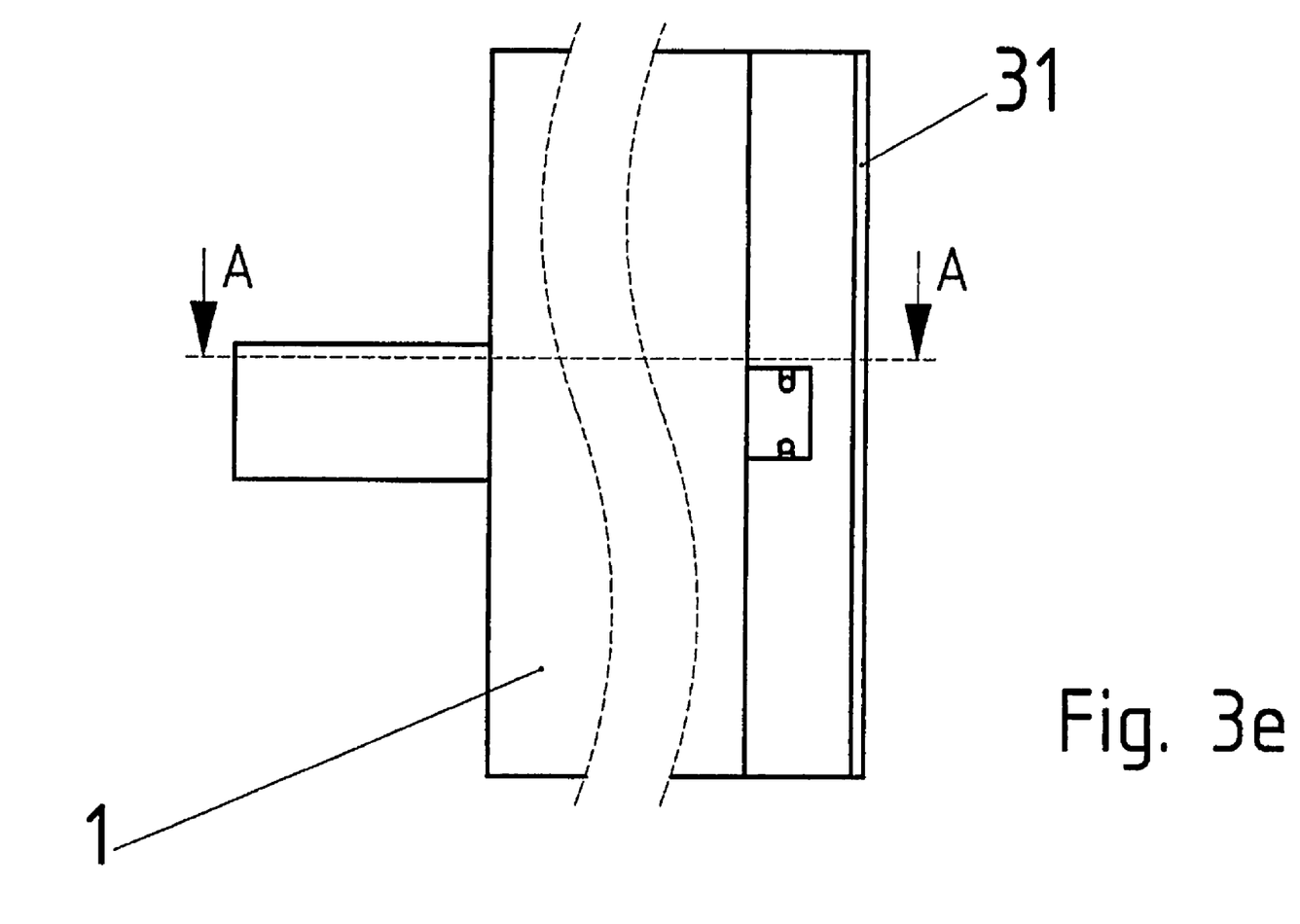
Figure 3F:
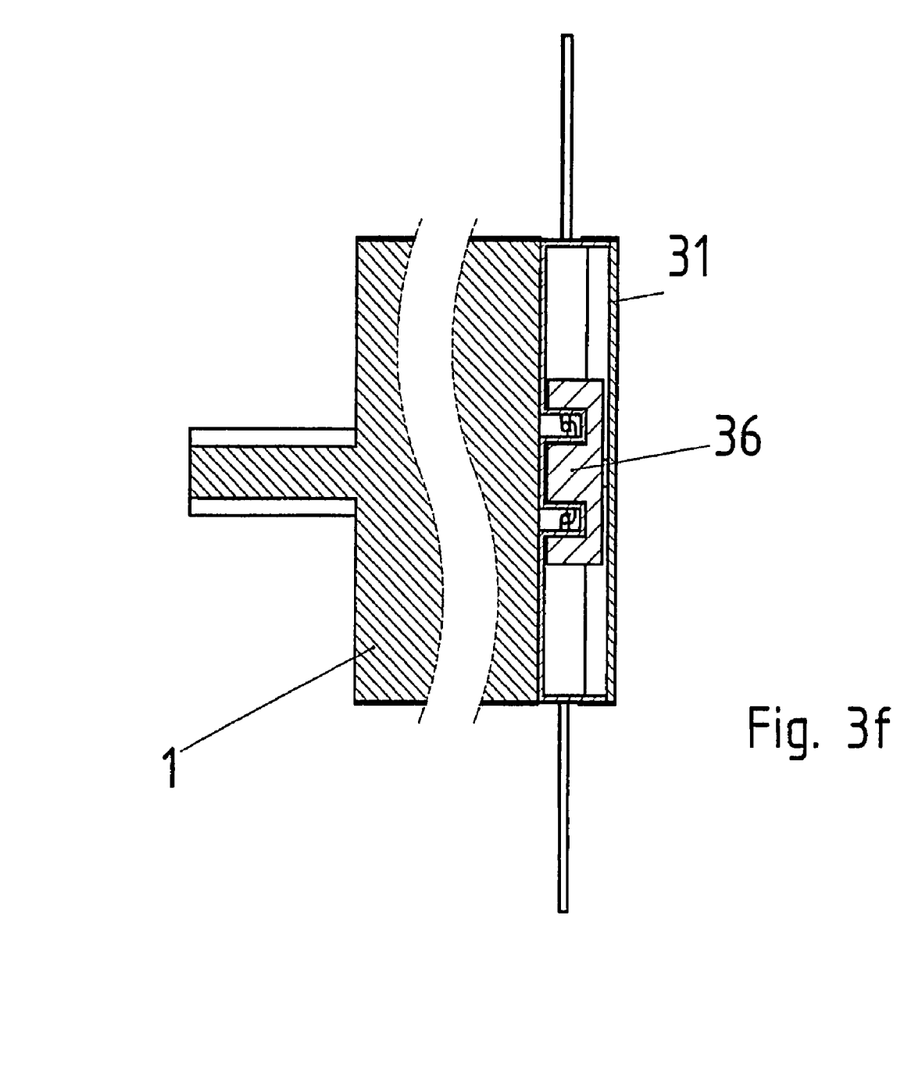
Figure 3G:
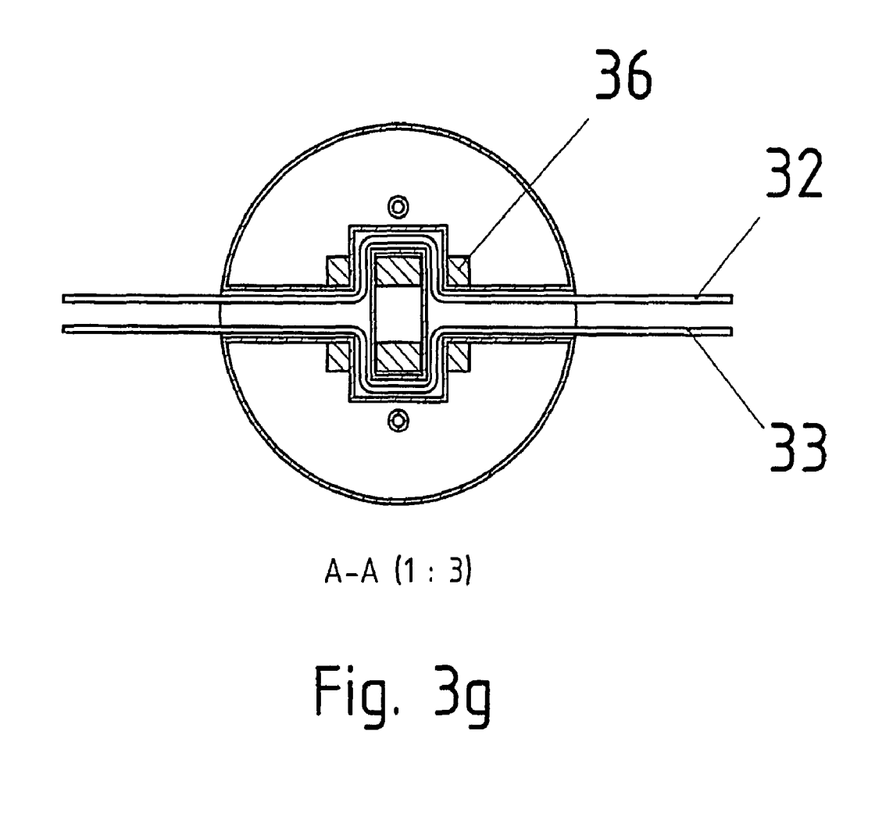
Figure 3H:
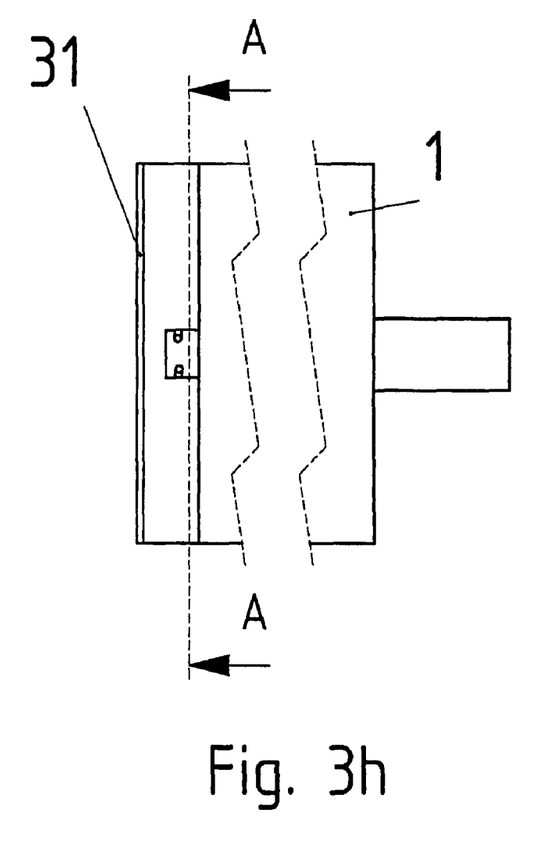

As illustrated in FIGS. 3a, 3b, 3c, 3d, 3e, 3f, 3g, and 3h, which illustrate different views, some that mask certain components as in FIG. 3b, first primary conductor 32 is arranged in a cable duct 34, which is provided in a semi-loop pointing upwardly. Second primary conductor 33 is arranged in a corresponding semi-loop pointing downwardly. For purposes of inductive coupling, an E-shaped core 36 is provided in the upper semi-loop, and a second E-shaped core 35 is provided in the lower semi-loop, e.g., in the material of the cover. The legs of the E of the E-shaped cores are brought forward to housing part 37. Housing part 37 protects a printed circuit board that carries windings, which are arranged in the shape of a spiral, are produced as conductor tracks, and are provided as secondary windings. For example, a flat, E-shaped core is placed on this printed circuit board and oriented such that its legs meet the legs of E-shaped core 36 when extended. Therefore, a highly effective inductive coupling is attainable, as illustrated in FIG. 3i. The printed circuit board may also be fitted with additional electronic components.

The function of cover 31 illustrated in FIG. 3a is to provide mechanical protection, and to be a clamping device, i.e., strain-relief device. In FIG. 3b, the material of cover 31 is omitted, so that E-shaped cores 35, 36 are visible, as well as cable ducts 34. The cover may be detachably screwed to housing 1.

In FIG. 3i, it may again be seen more clearly how primary conductors 32, 33 are pressed into the cable ducts manufactured as grooves.

This cover may include magnetically conductive material for improved energy coupling. In particular, this material may also be formed in the shape of a U or E.

Primary conductors 32, 33 in the cable ducts may be provided with encapsulating material for fixing them in position and sealing them.

Figure 3J:
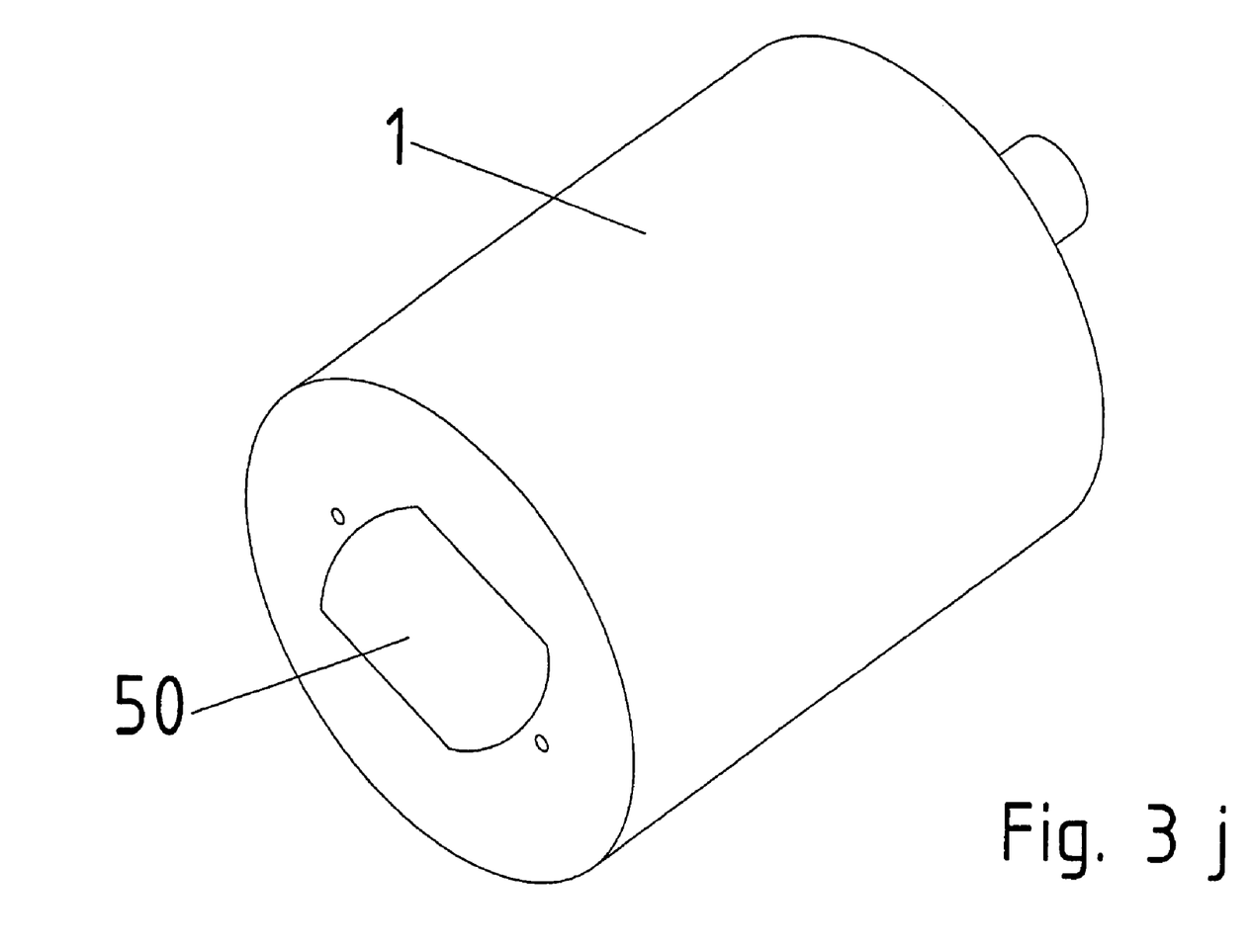

As illustrated in FIG. 3i, two E-shaped cores 41 may be inserted in housing 1, a secondary winding being placed around the middle legs of the E-shaped cores. The attachment of cover 31 takes place in tap holes 40. In FIG. 3j, region 50 for a flat receiver head is illustrated. Its secondary winding is manufactured as a printed circuit board layout, i.e., to be very flat on a printed circuit board. The printed circuit board is produced in the shape of region 50. The printed circuit board is fitted with an E-shaped core, the secondary winding being wound around the middle legs of the E, and the two other legs being arranged in the external region, around the secondary winding. The legs are very short, e.g., in comparison with the overall length of the E. Therefore, the transformer head may be manufactured as described in German Patent Application No. 103 12 284.2.

The loads may be powered in series by the primary conductor. It is possible to decouple individual loads without having to interrupt the power supply of the others. It is only necessary to remove the primary-conductor loop around the drive unit, e.g., by lifting the conductor Loop out of the indentation.

The wiring may eliminate the need for T-pieces.

The method for contact-free energy transmission and the corresponding components may be implementable according to the features described in German Published Patent Application No. 100 53 373, German Published Patent Application No. 103 12 284, German Published Patent Application No. 103 12 792, German Published Patent Application No. 103 39 340, German Published Patent Application No. 103 38 852, German Published Patent Application No. 103 49 242, German Published Patent Application No. 103 44 144, German Published Patent Application No. 44 46 779, or also PCT International Published Patent Application No. WO 92/17929. In this context, it may be provided to use a medium frequency of approximately, e.g., 15 to 30 kHz. The adapter circuit following the transformer head, including the coil core, may be manufactured to be passive, i.e., without electronic power semiconductors.

What is claimed is:

1. A system, comprising:
  a load; and
  a device adapted to inductively power the load;
  wherein at least one primary conductor is arranged in at least one of (a) an indentation and (b) a cable duct at least one of (a) on and (b) in the load.

2. The system according to claim 1, wherein the device includes an electronic circuit adapted to power parts of the load.

3. A system, comprising:
  a load; and
  a device adapted to inductively power the load;
  wherein at least one primary conductor is arranged in at least one of (a) an indentation and (b) a cable duct of the load; and
  wherein the load includes a drive unit including an electric motor and an electronic circuit adapted to power the electric motor.

4. The system according to claim 3, wherein the load includes a primary conductor such that an inductive coupling to a secondary winding included in the load is providable.

5. A system, comprising:
  a load; and
  a device adapted to inductively power the load;
  wherein at least one primary conductor is arranged in at least one of (a) an indentation and (b) a cable duct of the load; and
  wherein at least one secondary winding is at least one of (a) wound around at least one of (a) a U-shaped and (b) an E-shaped core or is wound in a flat core.

6. A system, comprising:
  a load; and
  a device adapted to inductively power the load;
  wherein at least one primary conductor is arranged in at least one of (a) an indentation and (b) a cable duct of the load; and
  wherein the primary conductors are at least one of (a) partially encapsulated and (b) retained by a cover.

7. A system, comprising:
  a load; and
  a device adapted to inductively power the load;
  wherein at least one primary conductor is arranged in at least one of (a) an indentation and (b) a cable duct of the load; and
  wherein the load is at least one of (a) impervious, (b) smooth on an outer surface, (c) provides a high degree of protection and (d) is adapted for use in at least one of (a) wet areas and (b) aseptic areas.

8. A system, comprising:
  a load; and
  a device adapted to inductively power the load;
  wherein at least one primary conductor is arranged in at least one of (a) an indentation and (b) a cable duct of the load; and
  wherein the load does not include a plug-and-socket connector or other electrical connection terminals on its exterior.

9. A system, comprising:
  a load; and
  a device adapted to inductively power the load;
  wherein at least one primary conductor is arranged in at least one of (a) an indentation and (b) a cable duct of the load; and
  wherein information is transmittable by modulating higher-frequency signals onto the primary conductor.

10. A system, comprising:
  loads powered in a contactless manner by inductively coupling each load to at least one primary conductor;
  wherein the at least one primary conductor is arranged in at least one of (a) an indentation and (b) a cable duct at least one of (a) on and (b) in the load.

11. The system according to claim 10, wherein the primary conductor is removable from the load.

12. A system, comprising:
  loads powered in a contactless manner by inductively coupling each load to at least one primary conductor;
  wherein the at least one primary conductor is arranged in at least one of (a) an indentation and (b) a cable duct of the load; and
  wherein the primary conductor is powered by an AC/AC converter.

13. The system according to claim 12, wherein the AC/AC converter is powered by an electrical network.

14. The system according to claim 12, wherein the AC/AC converter is powered by an electrical network at one of (a) 50 Hz and (b) 60 Hz.

15. A system, comprising:
  loads powered in a contactless manner by inductively coupling each load to at least one primary conductor;
  wherein the at least one primary conductor is arranged in at least one of (a) an indentation and (b) a cable duct of the load; and
  wherein at least one primary conductor is supported in the load in one of (a) a force-locked and (b) a form-locked manner.

16. A system, comprising:
  loads powered in a contactless manner by inductively coupling each load to at least one primary conductor;
  wherein the at least one primary conductor is arranged in at least one of (a) an indention and (b) a cable duct of the load; and
  wherein at least one primary conductor is encapsulated in the load.

17. A system, comprising:
  loads powered in a contactless manner by inductively coupling each load to at least one primary conductor;

wherein the at least one primary conductor is arranged in at least one of (a) an indention and (b) a cable duct of the load; and wherein loads are arranged on a moving part.

18. The system according to claim 17, wherein the moving part includes at least one of (a) a turntable and (b) a linear drive.

19. The system according to claim 17, wherein the part is one (a) rotationally mounted and (b) linearly moveable.

20. A system, comprising:
   loads powered in a contactless manner by inductively coupling each load to at least one primary conductor;
   wherein the at least one primary conductor is arranged in at least one of (a) an indention and (b) a cable duct of the load; and
   wherein the primary conductor is acted upon by a medium-frequency, alternating current.

21. A system, comprising:
   loads powered in a contactless manner by inductively coupling each load to at least one primary conductor;
   wherein the at least one primary conductor is arranged in at least one of (a) an indention and (b) a cable duct of the load; and
   wherein the primary conductor is acted upon by a medium-frequency, alternating current of approximately 10 to 50 kHz.

22. A system, comprising:
   loads powered in a contactless manner by inductively coupling each load to at least one primary conductor;
   wherein the at least one primary conductor is arranged in at least one of (a) an indention and (b) a cable duct of the load; and
   wherein the primary conductor is acted upon by a medium-frequency, alternating current of approximately 20 kHz.

23. A system, comprising:
   loads powered in a contactless manner by inductively coupling each load to at least one primary conductor;
   wherein the at least one primary conductor is arranged in at least one of (a) an indention and (b) a cable duct of the load; and
   wherein the primary conductor is adapted to power the loads in series.

24. The system according to claim 10, wherein the primary conductor is at least one of (a) supplied with energy in a contactless manner by stationary coil cores including at least one coil winding and (b) supplied with energy by a loop wire.

25. The system according to claim 10, wherein the primary conductor is arranged as a closed loop.

26. The system according to claim 10, wherein the primary conductor and load are galvanically decoupled.

* * * * *